(No Model.)

R. M. JOHNSON.
NUT LOCK.

No. 377,307.   Patented Jan. 31, 1888.

WITNESSES:
Th. Rollé
A. P. Grant.

INVENTOR.
Robert M. Johnson
BY John A. Wiedersheim
ATTORNEY.

N. PETERS. Photo-Lithographer, Washington, D. C.

United States Patent Office.

ROBERT M. JOHNSON, OF MOUNT HOLLY, NEW JERSEY.

NUT-LOCK.

SPECIFICATION forming part of Letters Patent No. 377,307, dated January 31, 1888.

Application filed February 3, 1887. Serial No. 226,421. (No model.)

*To all whom it may concern:*

Be it known that I, ROBERT M. JOHNSON, a citizen of the United States, residing at Mount Holly, in the county of Burlington, State of New Jersey, have invented a new and useful Improvement in Nut-Fasteners, which improvement is fully set forth in the following specification and accompanying drawings, in which—

Figure 1:
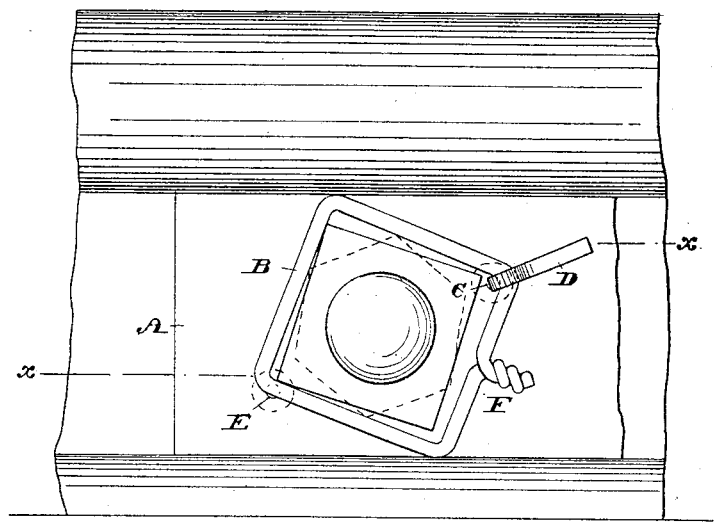
Figure 2:
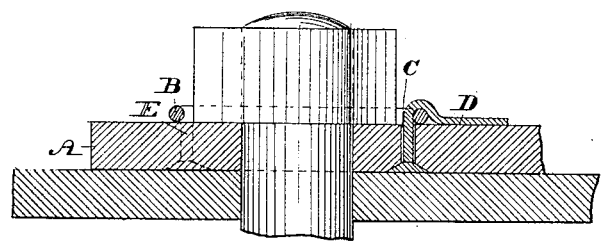

Figure 1 represents a front view of a nut-fastener embodying my invention. Fig. 2 represents a section thereof in line $x$ $x$, Fig. 1.

Similar letters of reference indicate corresponding parts in the two figures.

My invention relates to improvements in nut-locks; and it consists in an angular link formed of wire and of such size as to permit the introduction of a flexible pin which is secured to the fish-plate between the said link and nut.

Referring to the drawings, A represents a fish or other back plate which, when applied to a railroad-rail, is located between the head and base of the rail, as usual.

B represents an angular link, which is formed of heavy wire, bar-iron, or other suitable metal, and made with several sides, so as to embrace the nut to be fastened. The said link is of such size as to permit the passage of a pin (afterward described herein) between its inner wall and the nut, and at the same time to so closely embrace the nut as not to permit the same to rotate within the said link.

In the plate A is an opening, C, through which is passed a pin, D, which may be readily bent, and constitutes a key for securing the link B to said plate, it being noticed that the head of the pin is at the back of the plate, the opening C being countersunk to receive said head, so that the latter is flush with the back of the plate. When the pin is fitted to the plate A, the latter is located in proper position and the bolt passed through the rail and plate. The nut is now screwed on the bolt, and when fully tightened the link is placed over the nut, care being taken to allow the portion of the pin on the face of the plate to pass through the link, it being seen that the link is sufficiently large to receive the pin and embrace the nut. The pin is now bent over the contiguous portion of the link, whereby the link is secured to the plate and also prevented from disengagement from the nut, the effect of which is the fastening of the nut in a reliable manner. It is not essential that the pin enter the link at a corner of the same, as shown in the drawings, for in some cases the nut may be so tightened that its sides do not extend diagonally, in which case the pin enters the link at either side between its corners or angles. Neither is it necessary to use exclusively a square or four-sided nut with the link, as the latter is adapted to receive a hexagonal nut without departing from my invention.

The plate is shown having another opening, E', in dotted lines, so that two pins may be employed for securing the link in position; but the single pin shown may be fitted in either opening, as desired.

When the pin is bent back to its normal condition, the link may be removed and the nut unscrewed and removed, as is evident.

When the link is made of wire or bar-iron, its ends are secured by twisting, as at F, avoiding welding or soldering, thus making the same strong, durable, and inexpensive.

I am aware that it is not new to construct a nut-fastener consisting of a disk adapted to embrace the nut and having a portion of its periphery notched or recessed, in which recesses or notches is secured a pin attached to a fish-plate; but I am not aware that it is common to employ a link formed as herein described, in connection with a flexible pin adapted to intervene between the nut and link and being bent to embrace the link, so as to hold the link in engagement with the nut, and thereby preventing the nut from turning on the bolt.

Having thus described my invention, what I claim as new, and desire to secure by Letters Patent, is—

The fish-plate A, having secured thereto the flexible pin D, the angular link B, formed of wire with twisted ends and of such size relative to the nut as to permit the passage of the pin between the nut and link, all of said parts being combined and arranged substantially as and for the purpose set forth.

ROBERT M. JOHNSON.

Witnesses:
JOHN A. WIEDERSHEIM,
A. P. GRANT.